(12) United States Patent
Voss et al.

(10) Patent No.: US 8,844,878 B2
(45) Date of Patent: Sep. 30, 2014

(54) HIGH LIFT SYSTEM FOR AN AIRCRAFT

(75) Inventors: Timo Voss, Hamburg (DE); Joachim Loerke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 955 days.

(21) Appl. No.: 12/671,572

(22) PCT Filed: Aug. 6, 2008

(86) PCT No.: PCT/EP2008/006484
§ 371 (c)(1),
(2), (4) Date: Dec. 23, 2010

(87) PCT Pub. No.: WO2009/019011
PCT Pub. Date: Feb. 12, 2009

(65) Prior Publication Data
US 2011/0101174 A1     May 5, 2011

Related U.S. Application Data

(60) Provisional application No. 60/954,325, filed on Aug. 7, 2007.

(30) Foreign Application Priority Data

Aug. 6, 2007 (DE) .......................... 10 2007 036 996

(51) Int. Cl.
*B64C 9/16* (2006.01)
*B64C 9/28* (2006.01)
(52) U.S. Cl.
CPC .... *B64C 9/16* (2013.01); *B64C 9/28* (2013.01)
USPC .......................................... 244/216; 244/215

(58) Field of Classification Search
USPC ....................... 244/211–216, 45 R, 46, 48, 53
See application file for complete search history.

(56) References Cited

U.S. PATENT DOCUMENTS 3,874,617 A * 4/1975 Johnson ......................... 244/216
4,172,575 A * 10/1979 Cole ............................. 244/216
(Continued)

FOREIGN PATENT DOCUMENTS

CN      2316252 Y      4/1999
CN      2466047 Y      12/2001
(Continued)

OTHER PUBLICATIONS

International Preliminary Report on Patentability and Written Opinion for corresponding PCT application PCT/EP2008/006484, Feb. 9, 2010.

(Continued)

*Primary Examiner* — Tien Dinh
*Assistant Examiner* — Michael A Fabula
(74) *Attorney, Agent, or Firm* — Ingrassia Fisher & Lorenz, P.C.

(57) ABSTRACT

A high lift system for an aircraft includes: a main wing, a flap disposed on the main wing of the aircraft that can be adjusted between a retracted position and several extended positions relative to the main wing by way of a flap actuating mechanism and a drive device, a carrier part disposed on the main wing to which the flap actuating mechanism is coupled and relative to which the flap actuating mechanism for adjusting the flap can be moved, where the carrier part is disposed on the main wing by way of a bearing device including an adjusting device with which the orientation of the carrier part relative to the orientation of the main wing can be adjusted.

12 Claims, 6 Drawing Sheets

(56) References Cited

U.S. PATENT DOCUMENTS

| | | | |
|---|---|---|---|
| 4,248,395 A * | 2/1981 | Cole | 244/216 |
| 4,283,029 A | 8/1981 | Rudolph | |
| 4,434,959 A * | 3/1984 | Rudolph | 244/215 |
| 4,444,368 A * | 4/1984 | Andrews | 244/216 |
| 4,448,375 A * | 5/1984 | Herndon | 244/216 |
| 4,705,236 A | 11/1987 | Rudolph | |
| 4,725,026 A | 2/1988 | Krafka et al. | |
| 4,784,355 A | 11/1988 | Brine | |
| 4,796,840 A * | 1/1989 | Heynatz | 244/215 |
| RE32,907 E * | 4/1989 | Rudolph | 244/215 |
| 4,840,331 A * | 6/1989 | Williams | 244/212 |
| 4,854,528 A * | 8/1989 | Hofrichter | 244/215 |
| 4,881,704 A * | 11/1989 | Hofrichter | 244/215 |
| 4,995,575 A * | 2/1991 | Stephenson | 244/216 |
| 5,207,400 A * | 5/1993 | Jennings | 244/216 |
| 5,230,487 A * | 7/1993 | Gartelmann et al. | 244/216 |
| 5,564,655 A * | 10/1996 | Garland et al. | 244/216 |
| 6,076,775 A * | 6/2000 | Bauer | 244/212 |
| 6,601,801 B1 | 8/2003 | Prow et al. | |
| 7,293,744 B2 * | 11/2007 | Perez-Sanchez et al. | 244/211 |
| 7,510,151 B2 * | 3/2009 | Perez-Sanchez | 244/213 |
| 7,600,718 B2 * | 10/2009 | Perez-Sanchez | 244/215 |
| 7,798,450 B2 * | 9/2010 | Patzelt et al. | 244/211 |
| 7,857,263 B2 * | 12/2010 | Gartelmann et al. | 244/213 |
| 7,861,978 B2 * | 1/2011 | Holert | 244/215 |
| 8,157,208 B2 * | 4/2012 | Recksiek et al. | 244/99.3 |
| 8,302,913 B2 * | 11/2012 | Schlipf | 244/215 |
| 2006/0226296 A1 * | 10/2006 | Perez-Sanchez | 244/215 |
| 2006/0226297 A1 * | 10/2006 | Perez-Sanchez | 244/216 |
| 2007/0102589 A1 * | 5/2007 | Holert | 244/215 |
| 2008/0042009 A1 * | 2/2008 | Gartelmann et al. | 244/99.3 |
| 2008/0169383 A1 * | 7/2008 | Patzelt et al. | 244/216 |
| 2008/0191089 A1 * | 8/2008 | Reckslek et al. | 244/99.3 |
| 2009/0308982 A1 * | 12/2009 | Schlipf | 244/215 |

FOREIGN PATENT DOCUMENTS

| | | |
|---|---|---|
| EP | 0075966 A | 4/1983 |
| GB | 2038737 A | 7/1980 |
| WO | 8401343 A | 4/1984 |

OTHER PUBLICATIONS

International Search Report for corresponding PCT application PCT/EP2008/006484, Jan. 23, 2009.

Chinese Office Action for corresponding CN Application No. 200880102375.1, dated Dec. 28, 2012.

* cited by examiner

HIGH LIFT SYSTEM FOR AN AIRCRAFT

The invention pertains to a high lift system for an aircraft.

BACKGROUND

Document EP-A-0 075 966 discloses an aileron system with ailerons each of which are slide mounted to a track member which is in turn pivotally mounted to a wing structure. Documents GB-A-2 038 737 and WO 84/01343A show a high lift system with bearing devices for a flap which have a distance from each other along the flow direction.

High lift systems for aircraft comprise high lift flaps that are arranged on the main wing of the aircraft and can be adjusted between a retracted position, in which the flap continuously complements the wing profile in an essentially gapless fashion, and several extended positions, in which a gap of given width forms between the wing and the flap and the flap is adjusted to a predetermined angle relative to the wing profile. The extending of the flap is generally realized in the form of a motion that comprises a rearward displacement of the flap relative to the wing and therefore an extension of the effective wing profile on one hand and an increase of the angle of attack of the flap along with an increase of the profile camber and therefore an increase of the aerodynamic lift on the other hand. The air flowing with a high speed from the underside of the wing to the upper side of the flap through the gap forming between the flap and the wing during the extending motion additionally contributes to increasing the lift.

One noteworthy system among the nowadays most popular types of high lift systems is, in particular, the so-called Fowler flap. During the extension of this flap, it moves rearward and away from the wing such that the aforementioned gap between the wing and the flap is formed, wherein an increase of the angle of attack of the flap is superimposed on this motion, particularly in the advanced stages of the flap extension. This combined motion is also referred to as Fowler motion.

Another known arrangement is referred to as Dropped Hinge Kinematics or Hinged Flap Kinematics, wherein the high lift flap is supported on a flap lever such that it can be pivoted about a pivot point arranged underneath the wing. As the name implies, the flap moves about the pivot point situated underneath the wing during the extension, namely along a path that has the shape of a circular arc.

Both described connections between the flap and the main wing, as well as the described drive units, make it possible to displace the flap from a retracted state into several intermediate positions with medium displacement paths and angles of rotation, as well as into a completely extended state.

Different high lift systems are known from U.S. Pat. Nos. 4,725,026, 4,784,355 and 6,601,801.

SUMMARY OF THE INVENTION

The invention is based on the objective of developing an improved high lift system that can be adapted to certain aircraft requirements.

According to the invention, the carrier part is arranged on the main wing by means of a bearing device that features an adjusting device, by means of which the orientation of the carrier part can be adjusted.

The invention creates a high lift system for an aircraft that features: a main wing, a flap that is arranged on the main wing of the aircraft and can be adjusted relative to the main wing between a retracted position and several extended positions by means of flap actuating elements and a drive device, as well as a carrier part arranged on the main wing, to which the flap actuating elements are coupled and relative to which the flap actuating elements can be moved in order to adjust the flap. The carrier part is arranged on the main wing by means of a bearing device that features an adjusting device, by means of which the orientation of the carrier part can be adjusted relative to the orientation of the main wing.

The adjusting device features at least one first adjusting device and one second adjusting device, wherein the first adjusting device is positioned upstream referred to the second adjusting device, and wherein at least one of the adjusting devices features a distance adjusting device, by means of which the distance of the upper side of the carrier part at a location the distance adjusting device from the wing chord of the main wing can be adjusted.

The first adjusting device features a joint for producing an articulated connection between the main wing and the carrier part, and the second adjusting device features a distance adjusting device.

In this case, the distance adjusting device may feature a screw connection with a receptacle device on the side of the carrier part and a receptacle device on the side of the main wing, a connecting element for connecting the receptacle devices, as well as a spacer.

The first adjusting device may generally be positioned upstream of the second adjusting device. The first adjusting device may be realized, in particular, in the form of an articulated bolt connection with a pin on the side of the wing that is rigidly connected to the main wing, a receptacle device on the carrier part and an axle that connects the receptacle device and the pin in an articulated fashion.

In these embodiments, the carrier part may be arranged underneath the wing such that it is aligned in the main flow direction and provided with a rail-like guiding device, on which a slide coupled to the flap is movably guided.

In this case, the connection between the slide and the flap may consist of a rigid connection and the slide may be adjustable by means of a spindle drive Or a lever drive.

The flap may be supported on the carriage by means of an articulated connection that extends angular or transverse to the main flow direction. The drive device may feature a rotary drive driving motor and an output lever that is coupled to the driving motor and to a connecting piece fixed on the flap.

In these alternatives, the flap may be adjustable by means of a bar linkage adjusting device.

The bar linkage adjusting device may furthermore feature: two connecting pieces that are connected to the main wing, the carrier part and an additional connecting piece, both of which are arranged on the main wing, wherein the carrier part is arranged underneath the connecting piece, wherein a lever that can be pivoted in an articulated fashion is coupled to the upper connecting piece by means of a pivot joint arranged thereon and a lever of respectively suitable length that can be pivoted in an articulated fashion is coupled to the carrier part by means of an additional pivot joint arranged thereon, wherein the lever coupled to the upper connecting piece is connected to a flap connecting piece and the lever coupled to the carrier part is connected to a flap connecting piece, and wherein both flap connecting pieces are arranged on the flap.

At least one spoiler may be movably coupled to the main wing. In this case, a motive coupling between the spoiler and the flap may be realized. The motive coupling between the spoiler and the flap may be realized, in particular, mechanically or in the form of a control or regulating system.

BRIEF DESCRIPTION OF THE DRAWINGS

The invention is described below with reference to the attached figures, in which.

DETAILED DESCRIPTION OF THE INVENTION

Figure 1:
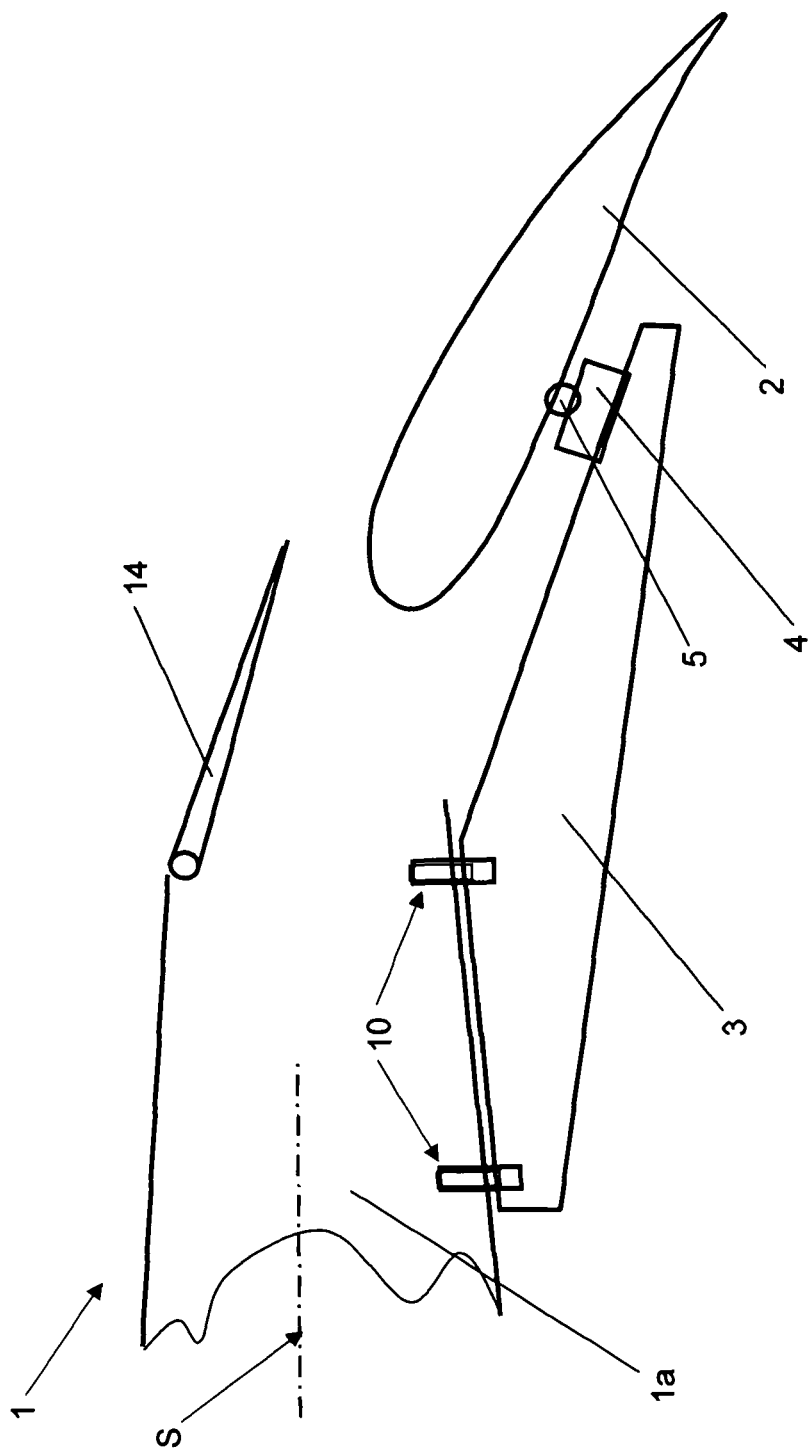
FIG. 1 shows a schematic lateral cross section through a high lift system for an aircraft with a track adjusting device according to one exemplary embodiment of the invention.
Figure 2:
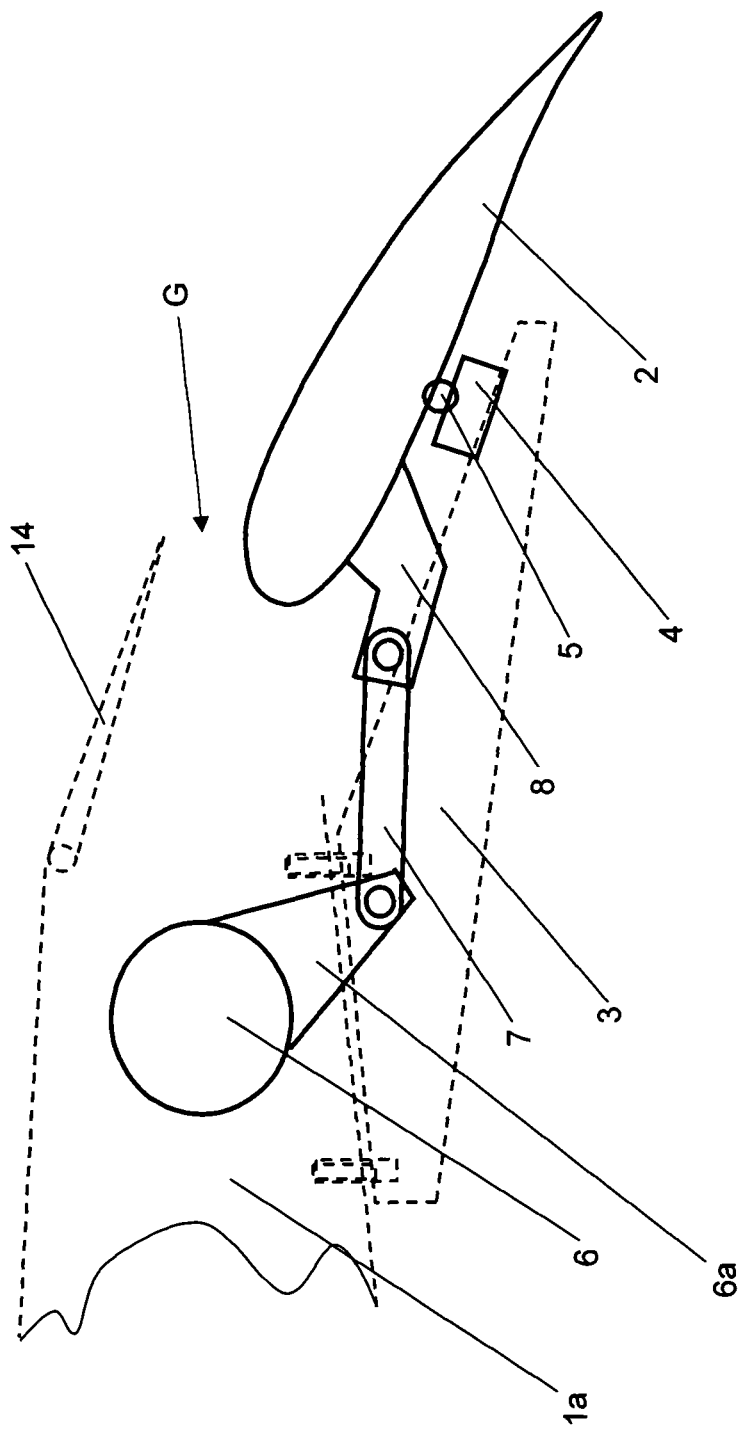
FIG. 2 shows a schematic lateral cross section through the high lift system according to FIG. 1 with an additional drive device.
Figure 3:
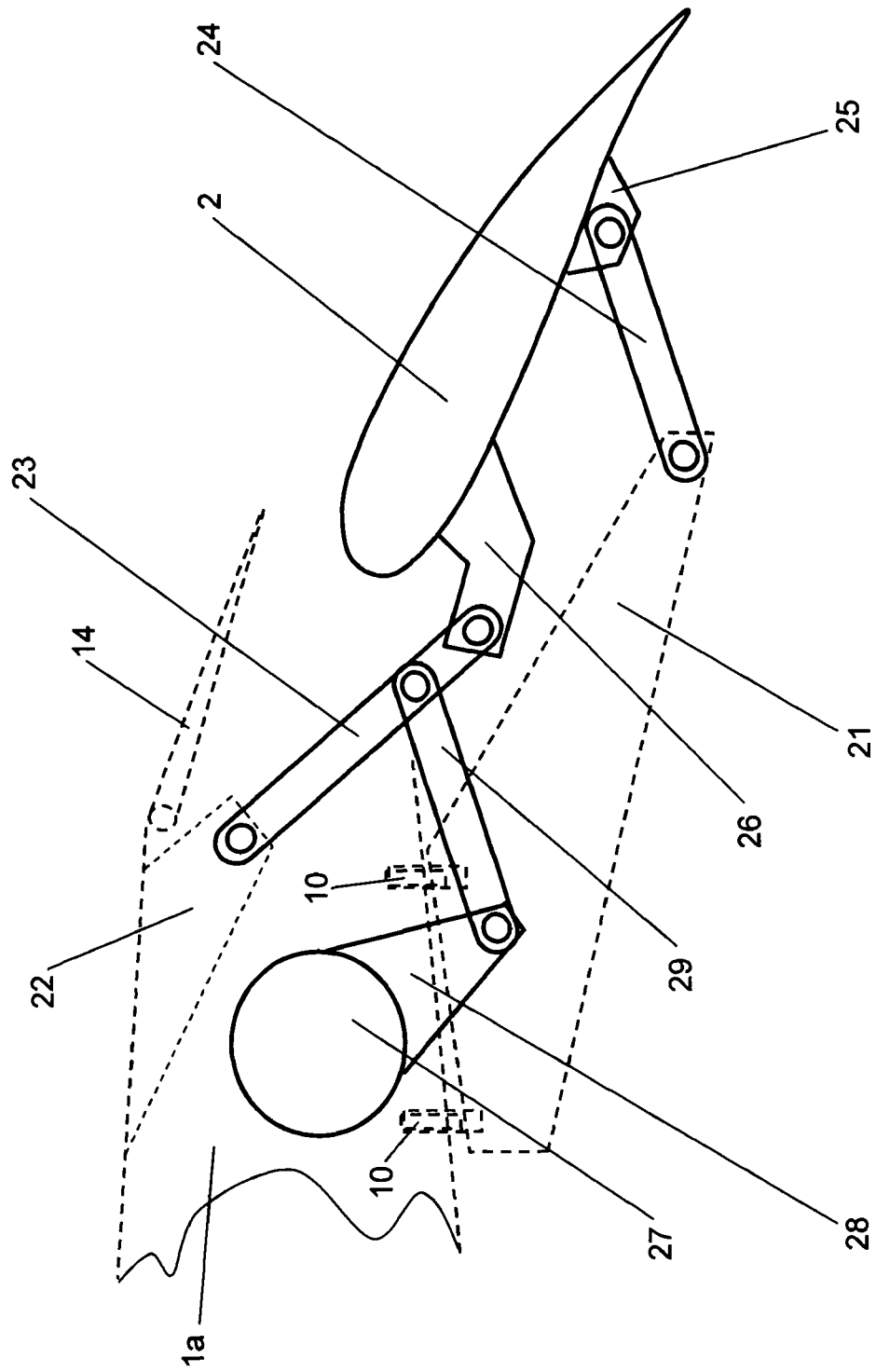
FIG. 3 shows a schematic lateral cross section through a high lift system for an aircraft with a bar linkage adjusting device according to another exemplary embodiment of the invention.

FIGS. 1 to 3 show a high lift system, in which the high lift flap 2 arranged on the main wing 1 of the aircraft is supported in a pivoted fashion, wherein the figures show an extended position of the flap 2 that lies between a retracted position, in which it continuously continues the wing profile in an essentially gapless fashion or in which the flap 2 complements the wing profile, and the completely extended position that corresponds to a landing position. In the extended positions, a gap G of given width forms between the main wing 1 and the flap 2, wherein the flap 2 is respectively adjusted to a predetermined angle relative to the wing profile.

The invention pertains, in particular, to lift-generating surfaces on aircraft or wings 1 with a wing box 1a that forms part of the main wing, as well as lift-increasing trailing edge flaps or flaps 2 that are connected to the wing or wing box.

According to the invention, a carrier part is arranged on the main wing or wing box by means of a bearing device 10, wherein the flap 2 that can be adjusted by means of a drive device is guided on said carrier part during its adjustment, and wherein the bearing device 10 features an adjusting device, by means of which the orientation of the carrier part can be adjusted.

The connection between the main wing or the wing box and the flaps can be realized by means of an adjusting device with flap actuating elements and a drive device and, in particular, by means of a track adjusting device or by means of a lever-bar adjusting device or linkage adjusting device. Both adjusting devices between the flap 2 and the wing 1, as well as the described drive units, make it possible to displace or adjust the flap 2 from a retracted position into several intermediate positions with medium displacement paths and angles of rotation, as well as into a completely extended state. Consequently, the following components are generally provided: a high lift system for an aircraft featuring a main wing, a flap 2 that is arranged on the main wing of the aircraft and can be adjusted relative to the main wing between a retracted position and several extended positions by means of flap actuating elements and a drive device, as well as a carrier part 3 arranged on the main wing 1, to which the flap actuating elements are coupled and relative to which the flap actuating elements can be moved in order to adjust the flap 2.

In a design of the adjusting device in the form of a track adjusting device, a carrier part 3 with a rail-like guiding device or a track is provided, wherein said carrier part is arranged underneath the wing such that it is essentially aligned in the main flow direction and connected to the wing by means of a bearing device 10. A flap actuating element in the form of a carriage or slide 4 is supported and guided on the carrier part with the rail-like guiding device 3 such that it can be moved in the direction of the carrier axis of the carrier part 3 and is simultaneously held in the two directions extending perpendicular thereto. The flap 2 is mounted on the carriage 4.

The flap 2 is moved by means of a drive device that is preferably composed of a rotary driving motor 6 or a rotary drive unit that features an output lever or a crank 6a and is arranged on the wing box 1, a drive rod or a drive strut 7 and a connecting piece 8 fixed on the flap 2. Alternatively, a drive device with the same driving functionality can be realized in the form of a suitable (not-shown) spindle drive, in which the spindle is set in rotation by means of a driving motor and the carriage 4 is coupled to the nut of the spindle drive such that the carriage 4 can be displaced along its track due to the rotation of the spindle.

The connection between the carriage 4 and the flap 2 may be realized in the form of a rigid connection such that the flap 2 is mounted immovably relative to the carriage or on the carriage 4. The position of the carriage is defined by its position on the track. Consequently, the flap does not have to be additionally fixed, particularly when utilizing a spindle drive. Alternatively, the flap 2 may be supported on the carriage by means of an articulated connection with an axle 5 that extends angular or transverse to the main flow direction as illustrated in FIG. 1. If the flap 2 is formed by a drive device with a rotary drive driving motor, a connecting piece 8 coupled to the output lever 6 and a connecting piece fixed on the flap 2, the flap 2 is held with respect to its angular position about the axle 5 by means of the drive device in this embodiment (see FIG. 2).

In a design of the adjusting device in the form of a bar linkage adjusting device, a carrier part 21 arranged on the main wing or wing box 1a and a flap actuating element in the form of a connecting piece 22 that is movably coupled to the main wing by means of a joint are provided, wherein the carrier part 21 is arranged underneath the connecting piece 22. Additional flap actuating elements consist of a lever 23 that can be pivoted in an articulated fashion and is coupled to the connecting piece 22 by means of a pivot joint arranged thereon and another lever 24 of respectively suitable length that can be pivoted in an articulated fashion and is coupled to the carrier part 22 by means of an additional pivot joint arranged thereon (see FIG. 3). The lever 23 coupled to the upper connecting piece is connected to a flap connecting piece 25 and the lever 24 coupled to the carrier part 21 is connected to a flap connecting piece 26, wherein both flap connecting pieces are arranged on the flap 2. The adjustment of the flap via the flap actuating elements may be realized with the aid of a drive device with a drive unit 27 or a driving motor, e.g., in the form of a rotary drive that is arranged on the wing box 1a and features an output lever 28 and a drive rod or drive strut 29 coupled to the lever 23. Alternatively, the drive of the mechanism may also be realized with the aid of a suitable (not-shown) spindle drive, in which the spindle can be set in rotation by means of a driving motor and the spindle is coupled to the wing box on one side and guided in a nut arranged on the lever 23 on the other side such that it is rotatable about its axis.

According to the invention, the carrier part 3, 21 is arranged on the main wing with the aid of a bearing device 10 that features an adjusting device, by means of which the orientation of the carrier part can be adjusted. The inventive solution makes it possible to realize the camber function of the wing profile of a given wing with main wing, flap and an adjusting device variable and therefore adaptable in dependence on the adjustment of the flap due to the aircraft-architectural parameters. In this context, the term camber function refers, in particular, to an increase of the wing chamber by extending the flap due to the actuation of the adjusting device with the actuating elements. The position of the extended flap and therefore, in particular, the connection between the wing and the flap is varied in order to vary the camber function. According to the invention, the flap may, for example, be displaced downward in the vertical direction in order to increase the wing camber.

This makes it possible to realize, in particular, a high lift system within an aircraft family or a family-communal high lift system, by means of which different requirements of the family derivatives with respect to aircraft fuselage length, aircraft masses, approach speeds, etc., can be met.

The adjusting device of the bearing device 10 of the carrier part 3, 21 is provided for adjusting the distance of a reference line of the carrier part 3, 21 that approximately extends in the direction of the wing chord from the wing chord of the main wing at a predetermined location of said reference line. The reference line may be the upper side of the carrier part 3, 21 or the connection of the connecting points of the carrier part on the side of the carrier part facing the main wing. The adjusting device features at least one first adjusting device 31 and one second adjusting device 32, wherein it is assumed that the first adjusting device is positioned upstream referred to the second adjusting device 32. In this case, at least one of the adjusting devices 31, 32 features a distance adjusting device 41 for adjusting the distance of the upper side of the carrier part 3, 21 on the distance adjusting device 41 from the wing chord of the main wing.

The adjustment of this distance may be fixed for the operation of the aircraft, in which case this distance should not be varied during the service life of the aircraft or be variable during the operating time of the aircraft. The invention may also be realized in such a way that the distance is variable while the aircraft is in use.

Figure 5:
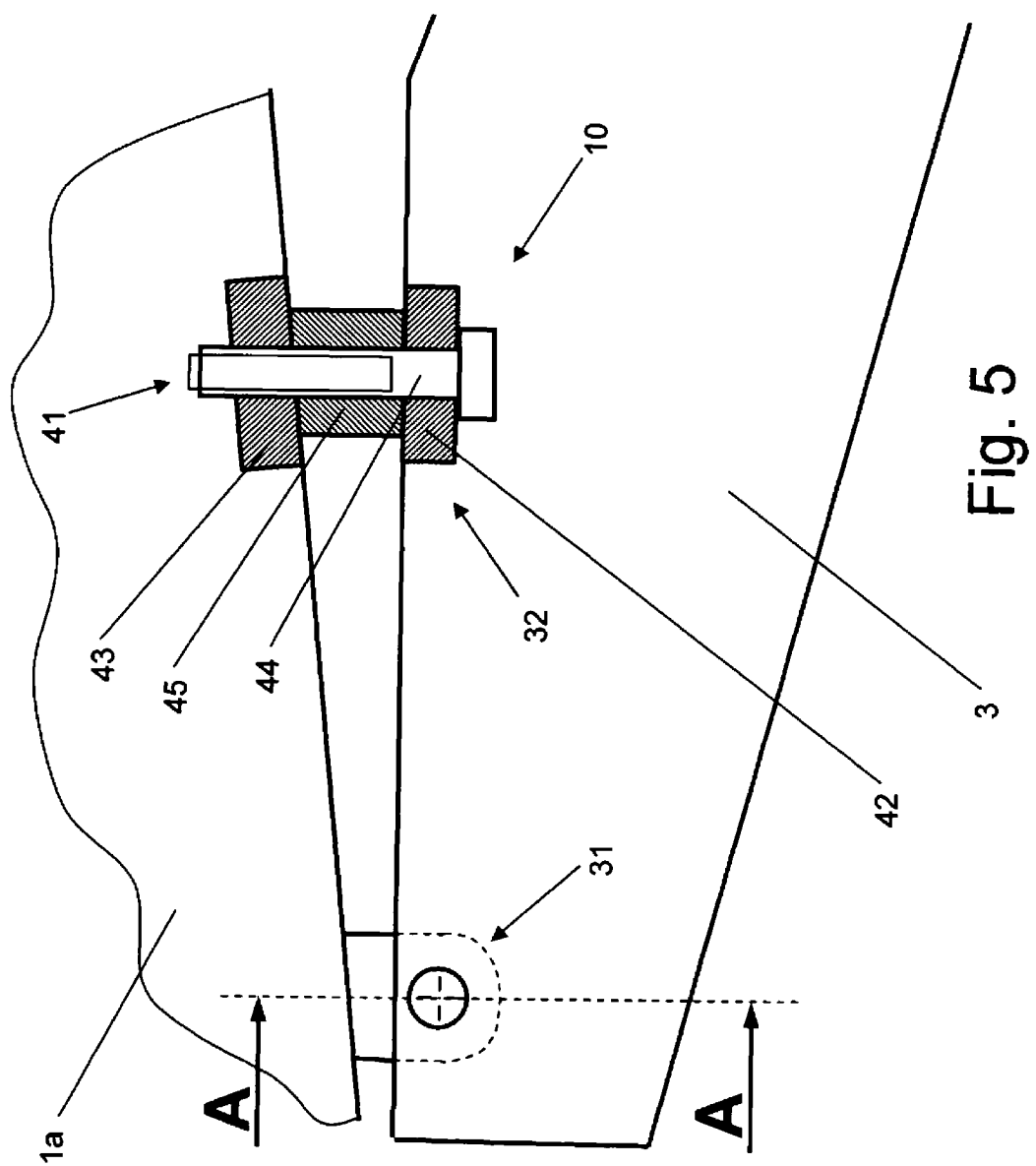
FIG. 5 shows an enlarged detail of one embodiment of the inventive bearing device for the flap carrier part in the form of a schematic lateral cross section.
Figure 6:
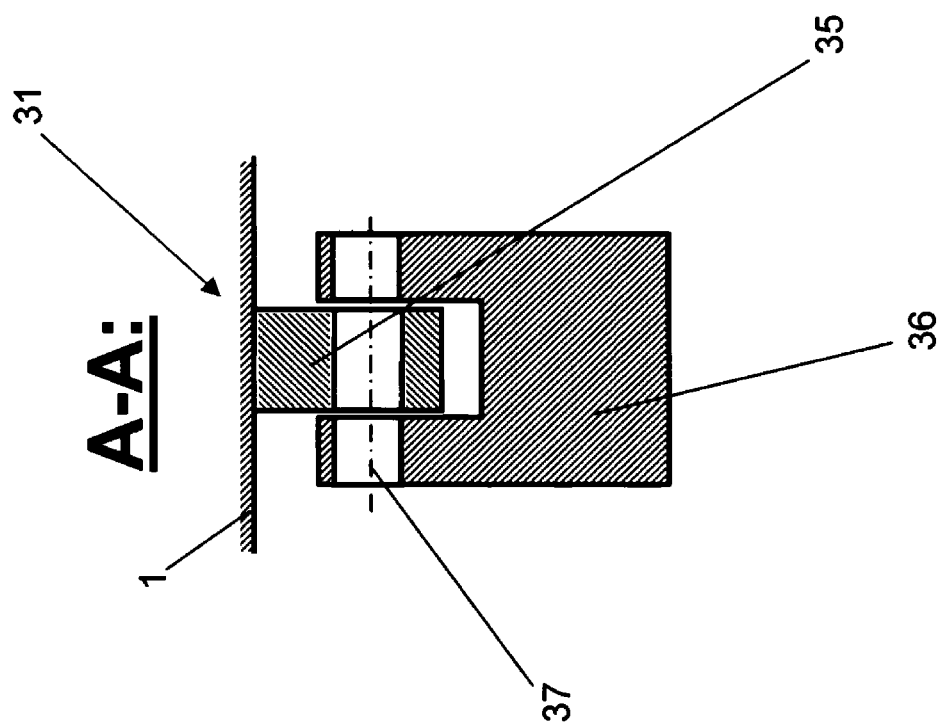
FIG. 6 shows a section along the line A-A in FIG. 5.

In one embodiment of the invention, the adjusting device is realized in such a way that the first adjusting device 31 features a joint and the second adjusting device features the distance adjusting device 41 as illustrated in the form of a concrete design in FIG. 5.

In this case, the upstream adjusting device of the two adjusting devices with one respective support point is realized in the form of a rotatable, articulated bolt connection consisting of a pin 35 on the side of the wing that is rigidly connected to the main wing 1, as well as a correspondingly designed receptacle device 36 on the carrier part 3, 21 and an axle 37 that connects the receptacle device and the pin in an articulated fashion. In the schematic drawing, the receptacle features a central recess for accommodating the pin.

The downstream adjusting device 32 may consist of: a screw connection 41 with a receptacle device 42 on the side of the carrier part or the side of the track and a receptacle device 43 on the side of the main wing or the side of the wing, a screw-type connecting element 44 (e.g., a corresponding screw) for producing a screw connection between the receptacle devices, as well as a corresponding spacer 45.

The adaptation or adjustment of the mechanism to the respective requirements is realized by utilizing a corresponding spacer 45 of suitable length.

Figure 4:
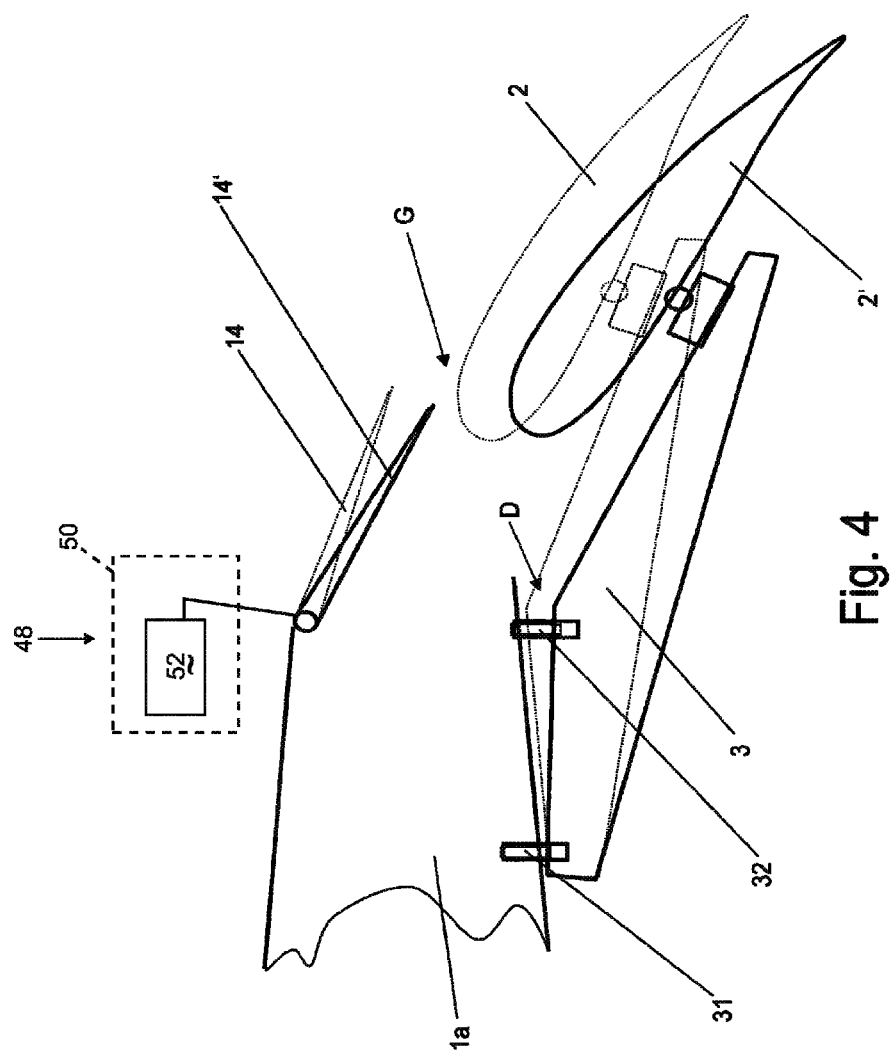
FIG. 4 shows a schematic side view of a high lift system for an aircraft with the inventive bearing device for the flap carrier part in two different adjusting states that are illustrated on top of one another, wherein a first state is illustrated with continuous lines and a second state is illustrated with broken lines.

Due to the suitable design of its adjusting devices, the carrier part 3, 21 can be mounted on the main wing in different angular positions, if applicable, with a track such that the vertical motion component of the flap can be influenced (see FIGS. 4 and 5).

The airfoil of the aircraft may be composed, in particular, of a main wing 1 with one of the aforementioned adjusting devices and a carrier part 3, a flap 2 and a spoiler 14 such that the invention makes it possible to carry out a suitable adaptation of the spoiler droop angle on existing wing constructions, to realize the profile chord continuously and to transfer the effect of the camber variation to the main wing upstream of the flap.

The adjustment of the orientation of the carrier part makes it possible to vary the camber and therefore to vary the aerodynamic coupling between main wing, spoiler and flap.

FIG. 4 shows an example of a camber increase that is realized by increasing the distance D due to a corresponding adjustment of the carrier part 3, namely at respectively identical flap positions, wherein the vertical component of the possible displacement path of the flap 2 is increased as a result thereof. The camber function for the entire wing is varied due to the adjustment of the carrier part 3 in such a way that the profile camber is increased when the flap 2' is partially extended and completely extended.

In an existing arrangement of a wing and a flap that features the same adjusting device and corresponding actuating elements, the camber characteristic of the main wing therefore can be suitably adjusted during an adjustment of the flap, particularly with respect to a continuous design of the profile chord and, if a spoiler is provided, the gap dimension between the main wing and the flap due to an increased spoiler droop angle. The illustration in FIG. 4 shows that the spoiler is displaced downward from a reference position or neutral position into a position 14' in an extended state 2' of the flap in order to maintain the gap G at a predetermined dimension and, e.g., to largely maintain the gap dimension constant within a predetermined adjusting range of the flap 2. This makes it possible, in particular, to realize a size and a shape of the gap between the wing and the flap that results in an energetic enhancement of the upper side boundary layer, an enlargement of the wing surface and an increase of the wing camber. Due to the variation of the carrier part orientation by means of the adjusting device, the aerodynamic properties of an entire existing wing can also be optimized at different adjusting states of the flap and, if applicable, also the spoiler.

If a spoiler or, in general, another flap positioned upstream of the flap is provided, a suitable gap dimension between the flap 2 and the spoiler 14 and therefore an increased effective wing camber can be realized for any adjusting state of the flap in connection with a corresponding adjusting state of the spoiler. To this end, a motive coupling 48 between the spoiler and the flap is provided, wherein this motive coupling 48 may be realized mechanically in the form of a corresponding adjusting mechanism or adjusting kinematics or with a control or regulating system, generally indicated with reference number 50 in FIG. 4.

In a mechanical coupling between the flap and the spoiler, the coupling between flap And spoiler may be realized with a suitable transmission ratio between the arrangement consisting of flap/flap kinematics/flap drive and the arrangement consisting of spoiler/spoiler joint/spoiler drive 52.

In the realization in the form of a control or regulating system, a corresponding sensor device may be provided on the flap in order to sense the respective flap position. A control or regulating device is functionally connected to the sensor device and receives the position values of the flap from the sensor device. If a control device is provided, command signals for the drive device 52 for adjusting the spoiler are determined from the current position values of the flap based on a table implemented in the control device, wherein these command signals serve for adjusting the spoiler in dependence on the respective flap adjusting state. If a regulating device is provided, command signals for the drive device 52 for adjusting the spoiler are determined from the current position values of the flap based on a regulating function implemented in the regulating device, wherein these command signals serve for adjusting the spoiler in dependence on the respective flap adjusting state.

An enlarged surface and an increased camber can be simultaneously realized in this fashion. An increased effective wing adjusting angle, i.e., the angle between the wing profile chord and the longitudinal aircraft axis, is simultaneously achieved with an unchanged leading wing edge. This makes it possible to compensate limitations during takeoff and landing due to the rotational clearance angle by means of an increased lift at small rotational angles.

Since the inventive solution makes it possible to adjust the spoiler droop for different conditions and/or constructions of a wing, it is possible to control the resistance generated by the high lift configuration. This in turn makes it possible to achieve an increased flexibility of the aircraft with respect to atypical approaches such as, e.g., steep approaches (steep approach) motivated by noise emissions.

The invention claimed is:

1. A high lift system for an aircraft, comprising:
   a main wing,
   a flap that is arranged on the main wing of the aircraft and is adjustable relative to the main wing between a retracted position and several extended positions by means of flap actuating elements and a drive device,
   at least one spoiler movably coupled to the main wing,
   a motive coupling provided between the at least one spoiler and the flap such that the spoiler moves in complementary fashion as the flap moves, and
   a carrier part arranged on the main wing, to which the flap actuating elements are coupled and relative to which the flap actuating elements are movable in order to adjust the flap wherein,
      the carrier part is arranged on the main wing with the aid of a bearing device that features an adjusting device comprising a first adjusting device and a second adjusting device which have a distance from each other along a flow direction, and by means of which an orientation of the carrier part is adjustable relative to an orientation of the main wing,
      at least one of the adjusting devices includes:
         a distance adjusting device, by means of which a distance of an upper side of the carrier part on the distance adjusting device from a wing chord of the main wing is adjustable and which distance adjusting device comprises:
            a screw connection with a receptacle device on a side of the carrier part,
            a receptacle device on a side of the main wing,
            a connecting element for adjustably connecting the receptacle devices,
            a spacer located between the upper side of the carrier part and the main wing, and
   wherein the motive coupling is configured to couple the adjustment of the flap to an adjustment of the spoiler in such a manner that the spoiler assumes a spoiler droop angle, at which a predetermined gap dimension between the spoiler and the flap exists, so that when the orientation of the carrier part relative to the orientation of the main wing is adjusted the motive coupling effects a corresponding change of the spoiler droop angle in the extended positions of the flap to maintain essentially the same gap dimension between the spoiler and the flap.

2. The high lift system according to claim 1, wherein the first adjusting device includes a joint for producing an articulated connection between the main wing and the carrier part and the second adjusting device includes a distance adjusting device.

3. The high lift system according to claim 1, wherein the first adjusting device is positioned upstream of the second adjusting device.

4. The high lift system according to claim 1, wherein the first adjusting device is in the form of an articulated bolt connection with a pin that is rigidly connected to the main wing, a receptacle device on the carrier part and an axle that connects the receptacle device and the pin in an articulated fashion.

5. The high lift system according to claim 1, wherein the carrier part is arranged underneath the wing such that it is aligned in the flow direction and guides a movable slide coupled to the flap.

6. The high lift system according to claim 5, wherein the connection between the slide and the flap includes a rigid connection and the slide is adjustable with respect to the carrier part by means the drive device, wherein the drive device features a rotary drive driving motor and an output lever that is coupled to the driving motor and to a connecting piece fixed to the flap.

7. The high lift system according to claim 5, wherein the flap is supported on the slide by means of an articulated connection that extends angular or transverse to the main flow direction.

8. The high lift system according to claim 7, wherein the drive device features a rotary drive driving motor and an output lever that is coupled to the driving motor and to a connecting piece fixed on the flap.

9. The high lift system according to claim 1, wherein the flap actuating elements comprise a bar linkage adjusting device.

10. The high lift system according to claim 9, wherein the bar linkage adjusting device includes:
    a first connecting piece that is connected to the main wing, such that the carrier part is arranged underneath the first connecting piece,
    second and third connecting pieces that are connected to the flap,
    a first lever that is coupled at a first end to the first connecting piece by means of a first pivot joint arranged thereon and is coupled at a second end to the second connecting piece of the flap by means of a second pivot joint arranged thereon,
    a second lever that is coupled at a first end to the carrier part by means of a third pivot joint arranged thereon and is coupled at a second end to the third connecting piece of the flap by means of a fourth pivot joint arranged thereon.

11. The high lift system according to claim 1, wherein the motive coupling between the spoiler and the flap is realized by at least one of: mechanically, with a control, and with a regulating system.

12. The high lift system according to claim 1, wherein the spoiler is movably coupled directly to the main wing.

* * * * *

UNITED STATES PATENT AND TRADEMARK OFFICE
CERTIFICATE OF CORRECTION

| | | |
|---|---|---|
| PATENT NO. | : 8,844,878 B2 | Page 1 of 1 |
| APPLICATION NO. | : 12/671572 | |
| DATED | : September 30, 2014 | |
| INVENTOR(S) | : Timo Voss and Joachim Loerke | |

It is certified that error appears in the above-identified patent and that said Letters Patent is hereby corrected as shown below:

In The Claims

Claim 1, line 24, "on" should be changed to --at a location of--

Claim 6, line 4, add --of-- after "means"; claim 6, line 7, "to" should be changed to --on--

Signed and Sealed this
Twenty-fourth Day of February, 2015

Michelle K. Lee
*Deputy Director of the United States Patent and Trademark Office*